United States Patent [19]

Ishikura et al.

[11] 4,379,872
[45] Apr. 12, 1983

[54] AMPHOTERIC AMINO SULFONATE DERIVATIVES OF EPOXY RESINS

[75] Inventors: Shin-Ichi Ishikura, Kyoto; Kazunori Kanda, Yao; Ryuzo Mizuguchi, Yawata, all of Japan

[73] Assignee: Nippon Paint Co., Ltd., Osaka, Japan

[21] Appl. No.: 293,077

[22] Filed: Aug. 17, 1981

[30] Foreign Application Priority Data

Aug. 22, 1980 [JP] Japan .................. 55-116292
Aug. 22, 1980 [JP] Japan .................. 55-116293

[51] Int. Cl.³ .................. C08G 59/14; C08L 63/00
[52] U.S. Cl. .................. 523/406; 260/509;
260/513 N; 523/409; 523/411; 523/412;
523/413; 523/414; 523/416; 524/723; 525/110;
525/113; 525/523; 528/109; 528/391
[58] Field of Search .................. 528/109, 391; 525/523,
525/110, 113; 260/513 N, 509; 523/406, 411,
523/409, 412, 413, 414, 416; 524/723

[56] References Cited

U.S. PATENT DOCUMENTS 2,860,160 11/1958 Sundberg et al. .............. 260/509 X
4,317,757 3/1982 Kooijmans et al. ............ 525/523 X Primary Examiner—Earl A. Nielsen
Attorney, Agent, or Firm—Millen & White

[57] ABSTRACT

Amphoteric amino sulfonate derivatives of epoxy resins having at least one terminal group of the formula:

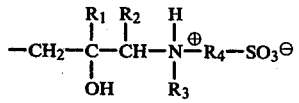

wherein $R_1$ and $R_2$ are hydrogen or methyl, $R_3$ is hydrogen or $C_1$-$C_{20}$ alkyl or substituted alkyl, and $R_4$ is $C_1$-$C_6$ alkylene or substituted alkylene, which are reaction products of an epoxy resin having a plurality of terminal groups of the formula:

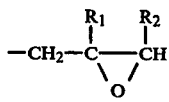

wherein $R_1$ and $R_2$ are as defined, with an amino sulfonate of the formula:

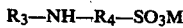

wherein $R_3$ and $R_4$ are as defined, and M is a cation.

11 Claims, No Drawings

AMPHOTERIC AMINO SULFONATE DERIVATIVES OF EPOXY RESINS

BACKGROUND THE INVENTION

This invention relates to amino sulfate derivatives of epoxy resins capable of uniformly dispersing in an aqueous medium. It also relates to uses of said amino sulfonate derivatives as an ingredient of water based coating compositions.

Epoxy resins have been used in various fields because of their excellent adhesive properties, high dielectric properties and the like. Normally, they are used as such or as a solution in an organic solvent. Since the resins themselves are generally hardly soluble in water, water based epoxy resin emulsions are prepared by emulsifying the resin in water with the aid of conventional surfactants. Epoxy resin emulsions, however, suffer from certain disadvantages that the resulting film does not have sufficiently strong mechanical, water-proof, anti-chemical and other characteristics.

Another approach to produce water based epoxy resins is to introduce a hydrophilic group into the molecule. To this end, Japanese Unexamined Patent Publication No. 55-3463 discloses the preparation of a water based epoxy resin by reacting the resin with an amino carboxylic acid to cleave the oxirane ring with a hydroxyl group being formed, and then esterifying the hydroxyl group with a dicarboxylic acid anhydride to form a hemi-ester having a pendant carboxyl group. This process requires two steps with two different reactants for cleaving the oxirane ring and esterifying the resultant hydroxy group, respectively. Furthermore, introduction of a great number of such pendant carboxyl groups per mole is required for epoxy resins having a hodrophobic backbone such as bisphenol type to impart a high acid number to the resin. This is not satisfactory because the resultant films are not sufficiently water-resistant.

It is, therefore, an object of the present invention to provide a water based epoxy resin composition free of abovementioned defects.

It is another object of the present invention to provide a water based epoxy resin composition having an amphoteric amino sulfonate terminal group, which is easy to prepare by a one-step reaction with a single reactant, and which retains most of benefical properties of the starting epoxy resin.

Other objects and advantages of the present invention will become apparent as the description proceeds.

DESCRIPTION OF THE INVENTION

According to the present invention, there is provided a water based epoxy resin composition having at least one terminal amphoteric amino sulfonate group of the formula:

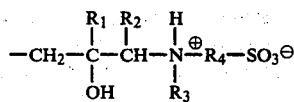

wherein $R_1$ and $R_2$ are hydrogen or methyl, $R_3$ is hydrogen or $C_1$–$C_{20}$ alkyl optionally having a substituent such as higher alkylsulfinyl or higher alkanoyloxy, and $R_4$ is $C_1$–$C_6$ alkylene optionally having a substituent such as 2-hydroxyethyl group.

The water based epoxy resin composition of the present invention is a reaction product of conventional epoxy resin having a plurality of terminal groups of the formula:

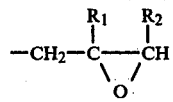

wherein $R_1$ and $R_2$ are as defined above, with an amino sulfonate of the formula:

wherein $R_3$ and $R_4$ are as defined above, and M is a cation, with the cation M being removed.

The starting epoxy resin used herein can be any of the well-known, commercially available epoxy resins. Typically included are those obtained by condensing epichlorohydrin or other halohydrins with bisphenol A, other polyhydric phenols or alcohols. Epoxy resins of the cycloaliphatic type and the polyolefin type may also be used.

Examples of the amino sulfonate of the above-described formula which may be used in the present invention include taurinate, 2-aminopropane-2-sulfonate, 3-aminobutane-1-sulfonate, 1-amino-2-methylpropane-2-sulfonate, 3-aminopentane-2-sulfonate, 4-amino-2-methylpentane-2-sulfonate, 3-aminopropane-1-sulfonate, 4-aminobutane-2-sulfonate, 4-aminobutane-1-sulfonate, 5-aminopentane-1-sulfonate, N-methyltaurinate, N-ethyltaurinate, N-isoproltaurinate, N-butyltaurinate, N-heptyltaurinate, N-dodecyltaurinate, N-heptadecyltaurinate, N-(2-stearoyloxyethyl)taurinate, N-(2-octadecylsulfinylethyl)taurinate, 2-(N-methylamino)-propane-1-sulfonate, 2-(N-octadecylamino)propane-1-sulfonate, 1-(N-methylamino)-2-methylpropane-2-sulfonate, 3-(N-methylamino)propane-1-sulfonate, and the like. Examples of cations to form the amino sulfonate include alkali metals, ammonium, and amines. Sodium or potassium is preferable.

The reaction between the epoxy resin and the amino sulfonate may be carried out by contacting these two reactants at a temperature from room temperature to 250° C. for a sufficient length of time for effecting the reaction, for example, for 30 to 120 minutes in a solvent such as water, an alcohol, a polyhydric alcohol, mono-lower alkyl ether of a polyhydric alcohol, dimethylformamide, dimethylacetamide, dimethylsulfoxide and the like. The resultant reaction product is then treated with an acid to form an inner salt.

The proportion of the aminosulfonate to the starting epoxy resin varies with the intended use of the water based epoxy resins composition and naturally with the nature of particular epoxy resin used. Generally 0.1 to 2 equivalents of amino sulfonate are preferable per one epoxy equivalent. Preferably, at least 20% of terminal epoxy groups are converted to the amino sulfonate groups.

The resultant water based epoxy resin compositions of the present invention exhibit unique chemical, physicochemical, surface active, electro-chemical and biological properties due to the presence of amphoteric amino sulfonate group. They may be easily dissolved or dispersed in a basic aqueous medium to form a water based liquid composition. Water and a mixture of water with a water-miscible organic solvent may be used as an aqueous medium. Alkali metal hydroxides such as sodium hydroxide, ammonia and amines such as tertiary amines may be used as a base. Ammonia and amines which are volatile at room temperature or elevated temperatures are preferable since they are not retained in the film after drying.

The water based, liquid epoxy resin compositions thus prepared may find a variety of important uses.

They may be used as water based adhesive compositions or water based coating compositions either alone or in combination with aminoplast resins such as urea, melamine and guanamine resins. Examples of usable aminoplast resins for this purpose include methylol derivatives of urea, melamine or guanamine and their wholly or partially etherified products with a lower alkanol. Methylolmelamine and hexamethoxymethylolmelamine are preferable. Aqueous coating compositions containing the water based liquid epoxy resin composition of this invention in combination with an aminoplast resin are of thermosetting type and the films obtained from these compositions have shown in practice more excellent peel strength, boiling water-resistance and other requisite properties than those obtained from conventional, solvent type, epoxy-aminoplast blended coating compositions.

As one of its important uses, the water based liquid epoxy resin composition of this invention may be used in place of conventional emulsifier or protective colloid in the preparation of soap-free polymeric emulsions. Polymeric emulsions also known as "synthetic latex" are usually prepared by polymerizing or copolymerizing unit monomers in water using the well-known emulsion polymerization technique. The resultant emulsions are largely used for water based coating compositions and adhesive compositions. The stability of such emulsions generally depends on the amount of emulsifier or protective colloid. Conventionally, anionic, cationic or nonionic surfactants are used as emulsifier for this purpose and water soluble polymers such as carboxymethylcellulose, polyvinyl alcohol and hydroxyethylcellulose are used as protective colloid. The presence of emulsifier and/or protective colloid is essential for emulsion type coating compositions but their presence in the finished coating film is not desirable because they tend to decrease water resistance, weather durability and other characteristics. The water based liquid epoxy resin composition of the present invention serves to stabilize the emulsion system when added to the aqueous continuous phase of such emulsions. Its presence in the finished coating film does not adversely affect but may improve the finished coating film.

Using the water based liquid epoxy resin composition of the invention, a variety of ethylenically unsaturated monomers may be polymerized. Examples of monomers include acrylates or methacrylates of $C_1$–$C_{12}$ alkanols such as methyl acrylate, methyl methacrylate, and n-butyl acrylate; polymerizable alcohols such as 2-hydroxyethyl acrylate, hydroxypropyl methacrylate, allyl alcohol, and methacryl alcohol; polymerizable carboxylic acids such as acrylic acid and methacrylic acid; polymerizable amides such as acrylamide and methacrylamide; polymerizable nitriles such as acrylonitrile and methacrylonitrile; polymerizable aromatic compounds such as styrene, α-methylstyrene, vinyltoluene, and t-butylstyrene, α-olefins such as ethylene and propylene; vinyl esters such as vinyl acetate and vinyl propionate; and dienes such as butadiene and isoprene.

Polymerization may be carried out by the conventional emulsion polymerization technique except conventional emulsifier and/or protective colloid are replaced by the water based liquid epoxy resin composition of the present invention.

The resulting soap-free polymeric emulsions are mechanically stable for a long period of time and may be used as low temperature drying emulsion coating compositions. Aminoplast resins of above-described types may be combined with the polymeric emulsion to give a water based thermosetting coating composition. The modified epoxy resin remaining in the finished film does not adversely affect the film but may exhibit benefical properties of epoxy resins.

The following examples will further illustrate the present invention. All parts and percentages in the examples are by weight unless otherwise specified.

SYNTHESIS OF MODIFIED EPOXY RESINS

EXAMPLE 1

A two liter flask having stirring means, a reflux condenser and temperature-control means was charged with 25 parts of taurine, 8 parts of sodium hydroxide, 100 parts of deionized water, and 400 parts of ethylene glycol monoethyl ether. The temperature was raised to 100° C. with stirring to give a uniform solution. To the solution was added with stirring a solution of 190 parts of EPIKOTE 828 (Shell Chemical Company, bisphenol A diglycidyl ether epoxy resin having an epoxy equivalent of 190) in 200 parts of ethylene glycol monoethyl ether over 2 hours. The mixture was stirred at the same temperature for additional 5 hours to complete the reaction. After the reaction, the mixture was acidified with hydrochloric acid. The resultant precipitate was recovered, purified by re-precipitating with ethylene glycol monoethyl ether, and then dried in vacuo.

205 parts of the desired modified epoxy resin were obtained. The acid number of this resin was shown to be 48.6 upon KOH titration and the sulfur content was 3% when determined by X ray fluorometry.

EXAMPLE 2

A flask used in Example 1 was charged with 73.5 parts of sodium taurinate, 100 parts of ethylene glycol, and 200 parts of ethylene glycol monomethyl ether. The temperature was raised to 120° C. with stirring to give a uniform solution. To the solution was added with stirring a solution of 470 parts of EPIKOTE 1001 (Shell Chemical Company, bisphenol A diglycidyl ether epoxy resin having an epoxy equivalent of 470) in 400 parts of ethylene glycol monomethyl ether over 2 hours. The mixture was stirred at the same temperature for additional 20 hours to complete the reaction. The reaction mixture was treated as in Example 1 to give 518 parts of modified epoxy resin. The resin had an acid number of 49.4 (KOH titration) and a sulfur content of 2.8% (X ray fluorometry).

EXAMPLE 3 TO 11

Following the procedure of Example 1, various aminosulfonates and epoxy resins shown in Table 1 were reacted to give modified epoxy resins shown in Table 1.

TABLE 1

| Example No. | Amino Sulfonate Name | Parts | Epoxy Resin Name | Parts | Modified Epoxy Resin Yield, parts | Acid No. | Sulfar content, % |
|---|---|---|---|---|---|---|---|
| 3 | N—methyltaurine | 161 | EPIKOTE 1001 | 470 | 590 | 87 | 4.9 |
| 4 | N—methyltaurine | 121 | EPIKOTE 1004*1 | 475 | 540 | 50 | 2.9 |
| 5 | 2-aminopropane-1-sulfonic acid | 32 | EPIKOTE 1009*2 | 300 | 308 | 16.5 | 0.91 |
| 6 | 6-aminohexane-1-sulfonic acid | 203 | DENAGOL X 832*3 | 280 | 442 | 112 | 6.4 |
| 7 | N—dodecyltaurine | 158 | TEPIC*4 | 110 | 237 | 101 | 5.8 |
| 8 | taurine | 147 | EPIKOTE 828 | 190 | 306 | 170 | 9.7 |
| 9 | taurine | 147 | EPIKOTE 1001 | 470 | 572 | 93 | 5.3 |
| 10 | N—methyltaurine | 48 | EPIKOTE 1001 | 470 | 480 | 22.5 | 1.3 |
| 11 | N—methyltaurine | 80 | EPIKOTE 828 | 190 | 247 | 107 | 61. |

*1 Shell Chemical Company, bisphenol A diglycidyl epoxy resin having an epoxy equivalent of 950.
*2 The same as above, epoxy equivalent 3000.
*3 Nagase Sangyo Co., Ltd., polyethyleneoxide diglycidyl epoxy resin having an epoxy equivalent of 280.
*4 Nissan Chemical Industries, Ltd., triglycidyl isocyanurate epoxy resin having an epoxy equivalent of 110.

WATER BASED LIQUID EPOXY RESIN COMPOSITIONS

EXAMPLE 12

A stainless steel beaker was charged with 158.8 parts of deionized water and 41.2 parts of dimethylaminoethanol. To the solution was added 200 parts of modified epoxy resin obtained in the above Example 8 while stirring by a disperser rotating at 200 RPM. The mixture was stirred for additional 1 hour to give a clear solution having a non-volatile content of 50%, a pH of 7.3 and a viscosity of 3600 cps.

EXAMPLE 13

A stainless steel beaker was charged with 175.8 parts of deionized water and, 10 parts of dimethylaminoethanol and 47.6 parts of ethylene glycol monomethyl ether. To the solution was added 100 parts of modified epoxy resin obtained in the above Example 9 while stirring by a disperser rotating at 200 RPM. The mixture was stirred for additional 1 hour to give a clear solution having a non-volatile content of 30%, a pH of 7.4 and a viscosity of 135 cps.

EXAMPLE 14

A stainless beaker was charged with 200 parts of deionized water and 2 parts of dimethylaminoethanol. To the solution was added 20 parts of modified epoxy resin obtained in the above Example 4 while stirring by a disperser rotating at 200 RPM. The mixture was stirred for additional 1 hour at 70° C. to give a slightly cloudy solution having a non-volatile content of 9%, a pH of 7.1 and a viscosity of 300 cps.

EXAMPLE 15 TO 21

Water based liquid epoxy resin compositions shown in Table 2 were prepared from various components shown in Table 2 as in the preceding examples.

TABLE 2

| Example No. | Deionized water, parts | DMAE*5 parts | TEA*6 parts | NaOH, parts | Modified epoxy resin | Parts | Water based liquid epoxy resin Non-volatile content, % | pH | Viscosity, cps*7 | Appearance |
|---|---|---|---|---|---|---|---|---|---|---|
| 15 | 295 | | | 5.2 | EX. 1 | 200 | 40 | 6.5 | 189 | Cloudy |
| 16 | 328 | 5.0 | | | EX. 2 | 100 | 30 | 6.1 | 107 | Cloudy |
| 17 | 167 | | 33.2 | | EX. 3 | 200 | 50 | 7.3 | 227 | Clear |
| 18 | 46 | 3.9 | | | EX. 6 | 200 | 80 | 4.2 | 2800 | Clear |
| 19 | 189 | 11.0 | | | EX. 7 | 50 | 20 | 7.5 | 663 | Clear |
| 20 | 193 | 7.3 | | | EX. 10 | 200 | 50 | 6.4 | 75 | Cloudy |
| 21 | 224 | 20.5 | | | EX. 11 | 200 | 45 | 6.0 | 314 | Cloudy |

*5 Dimethylaminoethanol
*6 Triethylamine
*7 measured by BL viscometer at 25° C.

WATER BASED COATING COMPOSITIONS IN COMBINATION WITH AMINOPLAST RESINS

EXAMPLE 22

To 300 parts of liquid epoxy resin composition prepared in Example 11 placed in a stainless steel beaker was added a solution of 18 parts of hexamethoxymethylolmelamine (CYMEL 303, American Cyanamid Co.) dissolved in a mixture of 9 parts of ethylene glycol monobutyl ether and 9 parts of deionized water, while stirring by a labomixer. The resulting clear composition had a non-volatile content of 32%, a pH of 7.2 and a viscosity of 750 cps.

This composition was applied onto a bonderized steel plate D of 0.8 mm thick, sold by Nippon Test Panel Co., Ltd., to a dry film thickness of 20 μm and baked for 5 minutes at 180° C. or 210° C. to form a smooth, transparent coating film. The film bad a pencil hardness of 3H upon peeling test in both cases.

The film was soaked in boiling water for one hour. The dissolving rate and the swelling rate were 2.4% and 56.1% respectively when baked at 180° C., and 1.6% and 53.8% respectively when baked at 210° C.

The above rates were calculated by the following equations:

Dissolving rate (%) = (B−D)/(B−A) × 100

Swelling rate (%) = (C−D)/(D−A) × 100 wherein A is the weight of steel plate, B is the total weight of steel plate plus coating film before soaking, C is the total weight of steel plate plus coating film immediately after the soaking, and D is the total weight of steel plate plus coating film when the soaked test piece was dried at 120° C. for 20 minutes.

EXAMPLE 23

The procedure of Example 22 was repeated except that the liquid epoxy resin composition prepared in Example 10 was used to give the same epoxy/aminoplast ratio as in Example 22. The resulting clear, water based coating composition was applied and baked on a steel plate and the resulting film tested as in Example 22. The film had a pencil hardness of 2H upon peeling test in both cases. The dissolving rate and the swelling rate were 4.8% and 24.5% respectively at a baking temperature of 180° C., and 2.6% and 13.6% respectively at a baking temperature of 210° C.

EXAMPLE 24

To 267 parts of liquid epoxy resin composition prepared in Example 16 placed in a stainless steel beaker was added a solution of 20 parts of water-soluble melamine resin (CYMEL 325, American Cyanamid Co.) in 10 parts of ethylene glycol monobutyl ether while stirring by a labomixer. The resulting clear composition was applied onto a dull steel plate to a dry film thickness of 35 $\mu$m and baked at 140° C. for 30 minutes to form a smooth, transparent film. The film had a pencil hardness of 2H, and excellent water-resistant properties.

EXAMPLE 25

The procedure of Example 24 was repeated except that each of liquid epoxy resin compositions prepared in Examples 15, 17 to 21 was mixed with 20 parts of CYMEL 303 in a ratio of 8:2 on dry basis to obtain a clear aqueous coating composition. Each of the resultant compositions gave a transparent smooth coating film when baked as in Example 24.

CONTROL EXAMPLE 1

To a solution of 150 parts of EPIKOTE 1001 (Shell Chemical Company, bisphenol A diglycidyl ether epoxy resin) in 75 parts of xylene and 75 parts of cellosolve acetate was added 15 parts of hexamethoxymethylolmelamine (CYMEL 303, American Cyanamid Co.).

The mixture was applied and baked on a bonderized steel plate as in Example 22. The pencil hardness of the resulting film was B at a baking temperature of 180° C. and HB at a baking temperature of 210° C. The dissolving rate and swelling rate were 70.3% and 6.6% respectively at a baking temperature of 180° C., and 25.5% and 1.8% respectively at a baking temperature of 210° C.

EMULSION POLYMERISATION OF ETHYLENEICALLY UNSATURATED MONOMERS

EXAMPLE 26

A 1 liter flask having stirring means, a reflux condenser and temperature control means was charged with 306 parts of deionized water, 7.5 parts of modified epoxy resin prepared in Example 8, and 1.0 parts of dimethylaminoethanol. The mixture was heated to 80° C. with stirring to give a uniform solution. To the solution were added, while maintaining the same temperature with stirring a solution consisting of 4.8 parts of azobiscyanovaleric acid, 4.56 parts of dimethylaminoethanol and 48 parts of deionized water. Then a monomer mixture consisting of 81 parts of styrene, 81 parts of methyl methacrylate, 108 parts of n-butyl acrylate and 30 parts of 2-hydroxyethyl acrylate was added dropwise over 60 minutes. After the addition of monomers, a solution consisting of 1.2 parts of azobiscyanovaleric acid, 1.14 parts of dimethylaminoethanol and 12 parts of deionized water was added. The mixture was stirred for additional 60 minutes to give a polymeric emulsion having a non-volatile content of 45%, a pH of 7.2 and a viscosity of 55 cps. The particle size of dispersed phase was found to be 135 m$\mu$ when measured by the light scatter method, and 72 m$\mu$ when measured by the electron microscopic method. The resulting emulsion was free of solid particles, and found to have a good mechanical stability. The emulsion did not undergo the phase separation of dispersed polymer particles upon 3 month standing at room temperature.

The above viscosity (at 25° C.) was measured by a B type viscometer. Mechanical stability was determined by rubbing one droplet of emulsion between fingers five times. The stability was judge to be good when the emulsion did not stick in this test. It was postulated that a larger particle size by the light scatter method were resulted from secondary aggregation of finer individual particles.

EXAMPLE 27

A stainless beaker was charged with 200 parts of deionized water and 0.2 parts of dimethylaminoethanol and 7.5 parts of modified epoxy resin prepared in Example 4.

The mixture was stirred by a disperser at 70° C. for 10 minutes. A slightly cloudy solution was obtained.

A flask used in Example 26 was charged with the above solution and 106 parts of deionized water, and the mixture maintained at 80° C. with stirring. To this were added a solution consisting of 4.8 parts of azobiscyanovaleric acid, 4.56 parts of dimethylaminoethanol and 48 parts of deionized water followed by adding dropwise a monomer mixture consisting of 67.5 parts of styrene, 67.5 parts of methyl methacrylate, 90 parts of n-butyl acrylate and 30 parts of 2-hydroxyethyl acrylate over 3 hours. After the addition of monomers, a solution consisting of 1.2 parts of azobiscyanovaleric acid, 1.14 parts of dimethylaminoethanol and 12 parts of deionized water was added. The mixture was stirred for additional 60 minutes to give a polymer emulsion having a non-volatile content of 44%, a pH of 7.1 and a viscosity of 60 cps. The particle size of dispersed phase was found to be 182 m$\mu$ by the light scatter method, and 83 m$\mu$ by the electron microscopic method. The resultant emulsion exhibited a good mechanical stability and a good storage stability.

EXAMPLE 28

A flask used in Example 26 was charged with 306 parts of deionized water, 45 parts of modified epoxy resin prepared in Example 3, and 6 parts of dimethylaminoethanol. The mixture was heated to 80° C. with stirring to give a uniform solution. To the solution were added while maintaining the same temperature with stirring a solution consisting 4.8 parts of azobiscyanovaleric acid, 4.56 parts of dimethylaminoethanol and 48 parts of deionized water. Then a monomer mixture consisting of 67.5 parts of styrene, 67.5 parts of methyl methacrylate, 90 parts of n-butyl acrylate, and 30 parts of 2-hydroxyethyl acrylate was added dropwise over 3 hours. After the addition of monomers, a solution consisting of 1.2 parts of azobiscyanovaleric acid, 1.14 parts of dimethylaminoethanol and 12 parts of deionized water was added. The mixture was stirred for additional 60 minutes to give a polymeric emulsion having a non-volatile content of 44%, a pH of 7.1 and a viscosity of 60 cps. The particle size of dispersed phase was found to be 110 m$\mu$ by the light scatter method, and 44 m$\mu$ by the electron microscopic method. The resultant emulsion exhibited a good mechanical stability and a good storage stability.

EXAMPLE 29 TO 38

The procedure of Example 26 was repeated except that various components shown in Table 3 were used. Properties of resultant polymeric emulsions are also shown in Table 3.

Abbreviations in Table 3 are as follows:
DMAE=dimethylaminoethanol
ST=styrene
MMA=methyl methacrylate
n-BA=n-butyl acrylate
2EHA=2-ethylhexyl acrylate
2HEA=2-hydroxyethyl acrylate
AA=acrylic acid
N.V.=non-volatile content
L.S.=light scatter method
E.M.=electron microscopic method 5 minutes in a hot air drier. A transparent, smooth coating film having a 60° gloss of 75 was obtained.

Similarly, polymeric emulsions prepared in Examples 27 to 32 were applied on similar steel plates by a bar coater respectively. Transparent and smooth coating films were obtained.

EXAMPLE 40

200 parts of polymeric emulsion prepared in Example 28 were admixed with a solution of 23 parts of hexamethoxymethylmelamine (CYMEL 303, American Cyanamid Co.) dissolved in 14 parts of ethylene glycol monobutyl ether and 14 parts of deionized water with stirring by a labomixer. The mixture was then adjusted at pH 8.3 with dimethylaminoethanol.

This composition was applied onto a bonderized steel plate D of 0.8 mm thick, sold by Nippon Test Panel Co., Ltd., to a dry film thickness of 20 $\mu$m, set for 10 minutes, and baked for 30 minutes at 120° C., 140° C. and 160° C., respectively, to form a transparent, smooth coating film.

The film was soaked in boiling water for one hour, and the dissolving rate and the swelling rate were determined as in Example 22.

The dissolving rates were 12.4%, 5.8% and 1.7% at a baking temperature of 120° C., 140° C. and 160° C., respectively. The swelling rates were 86.8%, 31.6% and 16.1% at baking temperatures of 120° C., 140° C. and 160° C., respectively.

When the film was soaked in conventional thinner for 1 hour, the dissolving rates were 16.9%, 5.5% and

TABLE 3

| Example No. | Modified epoxy resin, parts | Deionized water, parts | DMAE, parts | Monomer mixture, parts | | | | | |
|---|---|---|---|---|---|---|---|---|---|
| | | | | ST | MMA | n-BA | 2-EHA | 2-HEA | AA |
| 29*8 | EX. 1 300 | 588 | 17.4 | 81 | 81 | | 108 | 30 | |
| 30 | EX. 2 130 | 519 | 6.5 | 80 | 80 | | 106 | 30 | 3 |
| 31 | EX. 3 9.9 | 306 | 1.26 | 81 | 81 | 108 | | 30 | |
| 32 | EX. 3 45 | 306 | 6 | 66 | 66 | 40 | 47 | 30 | |
| 33 | EX. 6 6 | 374 | 0.12 | 85 | 85 | 112 | | 15 | |
| 34*8 | EX. 7 30 | 763 | 6.6 | 81 | 81 | | 108 | 30 | |
| 35 | EX. 9 15 | 306 | 1.7 | 81 | 81 | 108 | | 30 | |
| 36 | EX. 9 45 | 306 | 5.04 | 67.5 | 67.5 | 90 | | 30 | |
| 37 | EX. 10 60 | 438 | 2.2 | 81 | 81 | 108 | | 24 | 6 |
| 38 | EX. 11 90 | 468 | 9 | 81 | 81 | | 108 | 30 | |

| | Properties of polymeric emulsion | | | | | |
|---|---|---|---|---|---|---|
| Example No. | N.V., % | pH | Viscosity, cps at 25° C. | Mechanical stability | Particle size, m$\mu$ | |
| | | | | | L.S. | E.M. |
| 29 | 50 | 6.1 | 320 | good | 134 | 41 |
| 30 | 45 | 6.0 | 268 | good | 147 | 44 |
| 31 | 45 | 7.3 | 45 | good | 158 | 90 |
| 32 | 44 | 7.4 | 50 | good | 92 | 47 |
| 33 | 45 | 4.5 | 1130 | good | 103 | 75 |
| 34 | 30 | 7.3 | 98 | good | 116 | 46 |
| 35 | 45 | 7.3 | 33 | good | 127 | 82 |
| 36 | 44 | 7.3 | 60.5 | good | 172 | 48 |
| 37 | 45 | 6.3 | 869 | good | 88 | 44 |
| 38 | 45 | 6.1 | 120 | good | 152 | 42 |

*8 1.5 liter flask was used.

WATER BASED COATING COMPOSITIONS MADE FROM POLYMERIC EMULSIONS

EXAMPLE 39

The polymeric emulsion prepared in Example 26 was applied on a glass plate by a bar coater #30, and dried at room temperature. A transparent, smooth coating film was obtained.

The same emulsion was applied on a bonderized steel plate D of 0.8 mm thick, sold by Nippon Test Panel Co., Ltd., by a bar coater #30, and then dried at 100° C. for 0.86% at baking temperatures of 120° C., 140° C. and 160° C., respectively, and the swelling rates were 120.7%, 39.4% and 23.8% at baking temperatures of 120° C., 140° C. and 160° C., respectively.

EXAMPLE 41

200 parts of polymeric emulsion prepared in Example 28 were admixed with a solution of 25.6 parts of methoxymethylolmelamine (CYMEL 370, American Cyanamid Co.) in 11.4 parts of ethylene glycol monobutyl ether and 14 parts of deionized water. The mixture was adjusted at pH 8.3 with dimethylaminoethanol.

A baked coating film was made from this composition and tested its water resistance and solvent resistance as described in Example 40. In the soaking test in boiling water, the dissolving rates were 6.0%, 3.3% and 1.8% at baking temperatures of 120° C., 140° C. and 160° C., respectively, and the swelling rates were 59.7%, 30.3% and 23% at baking temperature of 160° C., respectively.

In the soaking test in conventional thinner, the dissolving rates were 1.7%, 0.82% and 0.35% at baking temperatures of 120° C., 140° C. and 160° C., respectively, and the swelling rates were 3.7%, 25.3% and 20.8% at baking temperatures of 120° C., 140° C. and 160° C., respectively.

EXAMPLE 42

The procedure of Example 40 was repeated except that emulsions prepared in Examples 26, 27, 29 to 38, respectively, were admixed with the aminoplast resin in a ratio of 8:2 on dry basis. The resulting films baked at each recited temperatures were transparent, smooth and water-resistant.

CONTROL EXAMPLE 2

To 244 parts of PRIMAL E-1561 (Rohm & Haas, self-crosslinking acrylic emulsion, non-volatile content 47%) were added 32 parts of ethylene glycol monobutyl ether and 12 parts of deionized water. The mixture was adjusted at pH 8.3 with dimethylaminoethanol.

A baked coating film was made from this composition and tested on its water resistance and solvent resistance as in Example 40.

In the soaking test in boiling water, the dissolving rates were 0.4%, 0.3% and 0.2% at baking temperatures of 120° C., 140° C. and 160° C., respectively, and the swelling rates were 38.0%, 32.2% and 39% at baking temperatures of 120° C., 140° C. and 160° C., respectively.

In the soaking test in conventional thinner, the film was peeled entirely in all cases.

COMPARATIVE EXAMPLE 3

200 parts of EPOXY-XY-616 (Mitsui Toatsu Chemical, water based, epoxy modified oil-free polyester resin) were admixed with a solution of 37.2 parts of CYMEL 303 dissolved in 50 parts of ethylene glycol monobutyl ether and 50 parts of deionized water with stirring by a labomixer.

A baked film was made from this composition and tested on its water resistance and solvent resistance as in Example 40.

In the soaking test in boiling water, the dissolving rates were 22.4%, 16.6% and 15.0% at baking temperatures of 120° C., 140° C. and 160° C., respectively, and the swelling rates were 109.5%, 38.0% and 26.4% at baking temperatures of 120° C., 140° C. and 160° C., respectively.

In the soaking test in conventional thinner, the dissolving rates were 36.0%, 13.9% and 7.7% at baking temperatures of 120° C., 140° C. 160° C., respectively, and the swelling rates were 196.0%, 58.0% and 46.3% at baking temperatures of 120° C., 140° C. and 160° C., respectively.

The above has been offered for illustrative purposes only, and it is not for the purpose of limiting the scope of this invention, which is defined in the claims below.

We claim:

1. A water-dispersible modified epoxy resin composition having at least one terminal amphoteric amino sulfonate group of the formula:

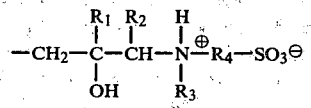

wherein $R_1$ and $R_2$ are hydrogen or methyl, $R_3$ is hydrogen or $C_1$–$C_{20}$ alkyl optionally substituted with higher alkylsulfinyl or higher alkanoyloxy, and $R_4$ is $C_1$–$C_6$ alkylene optionally substituted with 2-hydroxyethyl, said composition being a reaction product of an epoxy resin having a plurality of terminal groups of the formula:

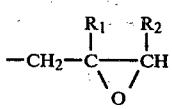

wherein $R_1$ and $R_2$ are as defined, with an amino sulfonate of the formula:

$$R_3-NH-R_4-SO_3M$$

wherein $R_3$ and $R_4$ are as defined, and M is a cation, with removal of said cation.

2. A water-based liquid epoxy resin composition comprising an aqueous basic medium and, dispersed in said medium, the modified epoxy resin composition of claim 1.

3. A water-based coating composition comprising the liquid epoxy resin composition of claim 2 in combination with an aminoplast resin.

4. The water-based coating composition of claim 3 wherein said aminoplast resin methylolmelamine or a lower alkyl ether of methylolmelamine.

5. A soap-free, polymeric emulsion comprising a dispersed phase consisting of finely divided particles of a film-forming polymer of ethylenically unsaturated unit monomers, and an aqueous continuous phase containing the modified epoxy resin composition of claim 1.

6. An emulsion type coating composition comprising a polymeric emulsion in combination with an aminoplast resin; wherein said polymeric emulsion is a soap-free polymeric emulsion comprising a dispersed phase of finely divided particles of a film-forming polymer of ethylenically unsaturated unit monomers, and an aqueous continuous phase containing a water-dispersible modified epoxy resin composition having at least one terminal amphoteric amino sulfonate group of the formula:

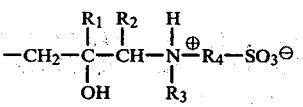

wherein $R_1$ and $R_2$ are hydrogen or methyl, $R_3$ is hydrogen or $C_1$–$C_{20}$ alkyl optionally substituted with higher alkylsulfinyl or higher alkanoyloxy, and $R_4$ is $C_1$–$C_6$ alkylene optionally substituted with 2-hydroxyethyl, said composition being a reaction product of an epoxy resin having a plurality of terminal groups of the formula:

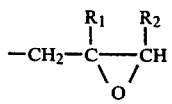

wherein $R_1$ and $R_2$ are as defined, with an amino sulfonate of the formula:

$$R_3-NH-R_4-SO_3M$$

wherein $R_3$ and $R_4$ are as defined, and M is a cation, with removal of said cation.

7. The emulsion type coating composition of claim 6 wherein said aminoplast resin is methylolmelamine or a lower alkyl ether of methylolmelamine.

8. The emulsion type coating composition of claim 6 wherein said unit monomer is an acrylate or methacrylate ester of a $C_1$-$C_{12}$ alkanol, a polymerizable alcohol having an ethylenically unsaturated bond, a polymerizable carboxylic acid, a polymerizable amide, a polymerizable nitrile, a polymerizable aromatic compound, a vinyl ester or a diene.

9. The water-dispersible modified epoxy resin composition of claim 1 wherein at least 20% of said terminal epoxide groups are converted to said amino sulfonate groups.

10. The water-dispersible modified epoxy resin composition of claim 9 wherein said aminosulfonate is taurinate, an N-($C_1$-$C_{20}$ alkyl)taurinate or 6-aminohexane-1-sulfonate.

11. The water-dispersible modified epoxy resin composition of claim 1 wherein said epoxy resin is a diglycidyl ether derived from a polyhydric phenol or a polyhydric alcohol.

* * * * *